(12) United States Patent
Li et al.

(10) Patent No.: US 8,743,751 B2
(45) Date of Patent: Jun. 3, 2014

(54) PEER DISCOVERY IN A WIRELESS WIDE AREA NETWORK SYSTEM

(75) Inventors: Junyi Li, Chester, NJ (US); Eduardo S. Esteves, San Diego, CA (US); Saurabh Tavildar, Jersey City, NJ (US); Matthew S. Grob, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 13/092,819

(22) Filed: Apr. 22, 2011

(65) Prior Publication Data

US 2012/0269250 A1 Oct. 25, 2012

(51) Int. Cl.
*H04B 7/00* (2006.01)
*H04W 76/02* (2009.01)

(52) U.S. Cl.
CPC .................................. *H04W 76/026* (2013.01)
USPC ......................................................... 370/310

(58) Field of Classification Search
CPC .. H04W 76/02; H04W 76/025; H04W 76/026
USPC ................. 370/310, 328, 338, 342, 343, 345; 455/422, 450, 507, 509
See application file for complete search history.

(56) References Cited

U.S. PATENT DOCUMENTS

| | | | |
|---|---|---|---|
| 7,450,950 B2 * | 11/2008 | Kim et al. ..................... | 455/453 |
| 7,613,156 B2 * | 11/2009 | Rittle et al. ................... | 370/338 |
| 7,907,571 B2 * | 3/2011 | Raghothaman et al. ...... | 370/331 |
| 8,068,454 B2 * | 11/2011 | Bonta et al. ................... | 370/329 |
| 8,160,034 B1 * | 4/2012 | Sarkar et al. .................. | 370/336 |
| 2005/0286466 A1 | 12/2005 | Tagg et al. | |
| 2008/0056269 A1 * | 3/2008 | Madhani et al. ........... | 370/395.2 |
| 2008/0069063 A1 | 3/2008 | Li et al. | |
| 2008/0112334 A1 * | 5/2008 | Laroia et al. .................. | 370/254 |
| 2008/0130483 A1 | 6/2008 | Khandekar et al. | |
| 2009/0285119 A1 | 11/2009 | Horn et al. | |
| 2009/0287827 A1 | 11/2009 | Horn et al. | |
| 2010/0165882 A1 | 7/2010 | Palanki et al. | |
| 2012/0182976 A1 * | 7/2012 | Thoukydides et al. ....... | 370/336 |
| 2012/0269115 A1 * | 10/2012 | Esteves et al. ................ | 370/328 |
| 2012/0269250 A1 * | 10/2012 | Li et al. ......................... | 375/227 |

OTHER PUBLICATIONS

International Search Report and Written Opinion-PCT/US2012/034581-ISA/EPO-Sep. 3, 2012.

* cited by examiner

*Primary Examiner* — Dmitry H Levitan
(74) *Attorney, Agent, or Firm* — James K. O'Hare

(57) ABSTRACT

A method of wireless communication of a wireless device includes receiving a signal indicating WWAN resources that can be utilized for communicating peer discovery signals. In addition, the method includes communicating an OFDM peer discovery signal in the WWAN resources. A method of wireless communication of a base station includes transmitting a signal to a wireless device indicating WWAN resources dedicated for a silence interval that can be utilized for communicating peer discovery signals. The WWAN resources dedicated for a silence interval include a first subset of resources and a second subset of resources. The method further includes measuring noise in the first subset of resources and refraining from measuring noise in the second subset of resources.

48 Claims, 11 Drawing Sheets

PEER DISCOVERY IN A WIRELESS WIDE AREA NETWORK SYSTEM

BACKGROUND

1. Field

The present disclosure relates generally to communication systems, and more particularly, to peer discovery in a wireless wide area network (WWAN) system.

2. Background

In a WWAN, all communication between wireless devices and a serving base station are through the uplink/downlink channels between the wireless devices and the serving base station. If two communicating wireless devices are in the vicinity of each other, the two wireless devices can communicate directly without going through the base station. Such direct peer-to-peer communication can enable new types of services and/or reduce the traffic load on the base station.

To enable peer-to-peer communication, wireless devices in the vicinity of each other may periodically participate in peer discovery by transmitting peer discovery signals. Methods for enabling peer discovery in WWAN systems are needed.

SUMMARY

In an aspect of the disclosure, a method of wireless communication includes receiving a signal indicating WWAN resources that can be utilized for communicating peer discovery signals. In addition, the method includes communicating an OFDM peer discovery signal in the WWAN resources.

In an aspect of the disclosure, a method of operating a base station includes transmitting a signal to a wireless device indicating WWAN resources dedicated for a silence interval that can be utilized for communicating peer discovery signals. The WWAN resources dedicated for a silence interval include a first subset of resources and a second subset of resources. The method further includes measuring noise in the first subset of resources and refraining from measuring noise in the second subset of resources.

In an aspect of the disclosure, an apparatus for wireless communication includes means for receiving a signal indicating WWAN resources that can be utilized for communicating peer discovery signals. In addition, the apparatus includes means for communicating an OFDM peer discovery signal in the WWAN resources.

In an aspect of the disclosure, an apparatus for wireless communication includes means for transmitting a signal to a wireless device indicating WWAN resources dedicated for a silence interval that can be utilized for communicating peer discovery signals. The WWAN resources dedicated for a silence interval include a first subset of resources and a second subset of resources. The apparatus further includes means for measuring noise in the first subset of resources. The apparatus further includes means for refraining from measuring noise in the second subset of resources.

In an aspect of the disclosure, a computer program product includes a computer-readable medium. The computer-readable medium includes code for receiving a signal indicating WWAN resources that can be utilized for communicating peer discovery signals. The computer-readable medium further includes code for communicating an OFDM peer discovery signal in the WWAN resources.

In an aspect of the disclosure, a computer program product includes a computer-readable medium. The computer-readable medium includes code for transmitting a signal to a wireless device indicating WWAN resources dedicated for a silence interval that can be utilized for communicating peer discovery signals. The WWAN resources dedicated for a silence interval include a first subset of resources and a second subset of resources. The computer-readable medium further includes code for measuring noise in the first subset of resources. The computer-readable medium further includes code for refraining from measuring noise in the second subset of resources.

In an aspect of the disclosure, an apparatus for wireless communication includes a processing system. The processing system is configured to receive a signal indicating WWAN resources that can be utilized for communicating peer discovery signals. The processing system is further configured to communicate an OFDM peer discovery signal in the WWAN resources.

In an aspect of the disclosure, an apparatus for wireless communication includes a processing system. The processing system is configured to transmit a signal to a wireless device indicating WWAN resources dedicated for a silence interval that can be utilized for communicating peer discovery signals. The WWAN resources dedicated for a silence interval include a first subset of resources and a second subset of resources. The processing system is further configured to measure noise in the first subset of resources. The processing system is further configured to refrain from measuring noise in the second subset of resources.

DETAILED DESCRIPTION

Figure 1:
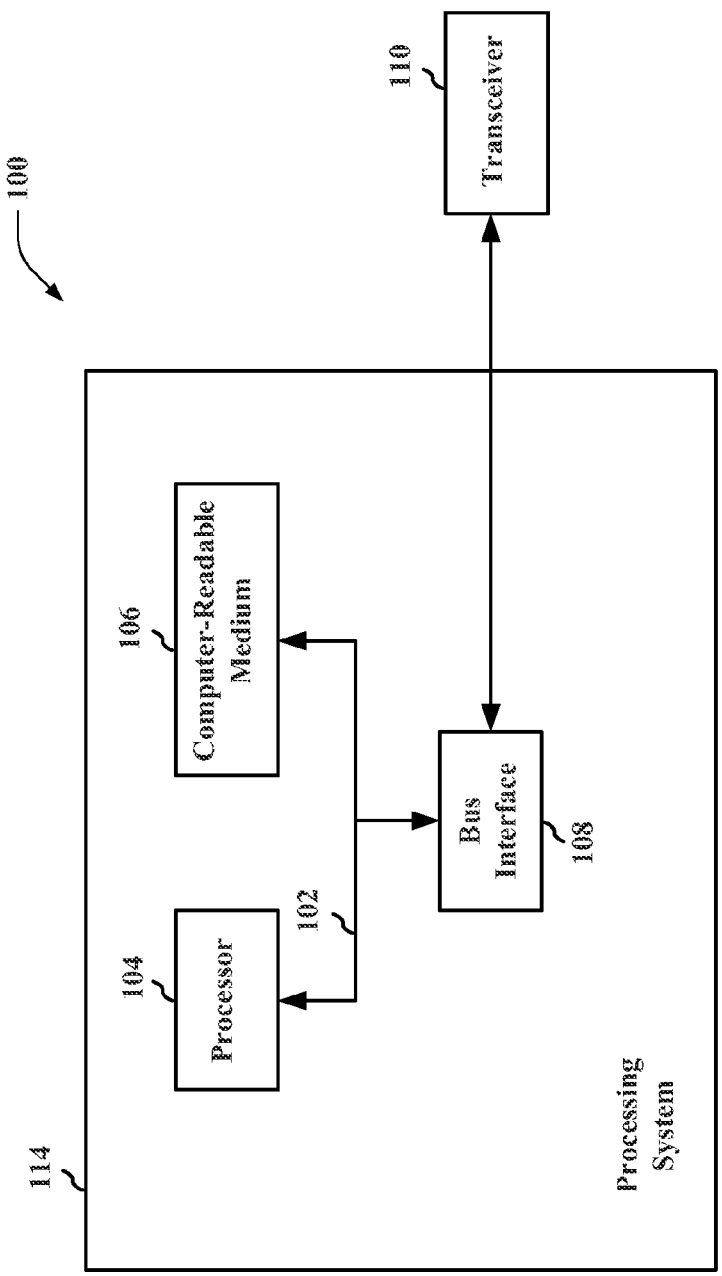
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
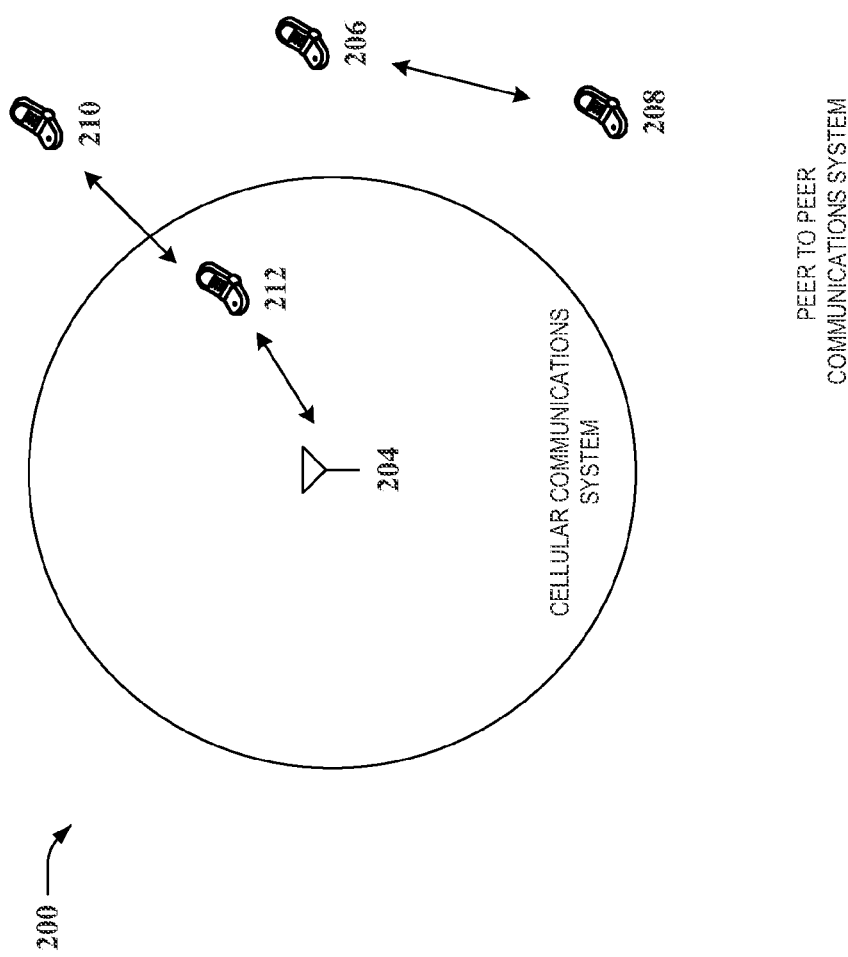
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a WWAN. Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
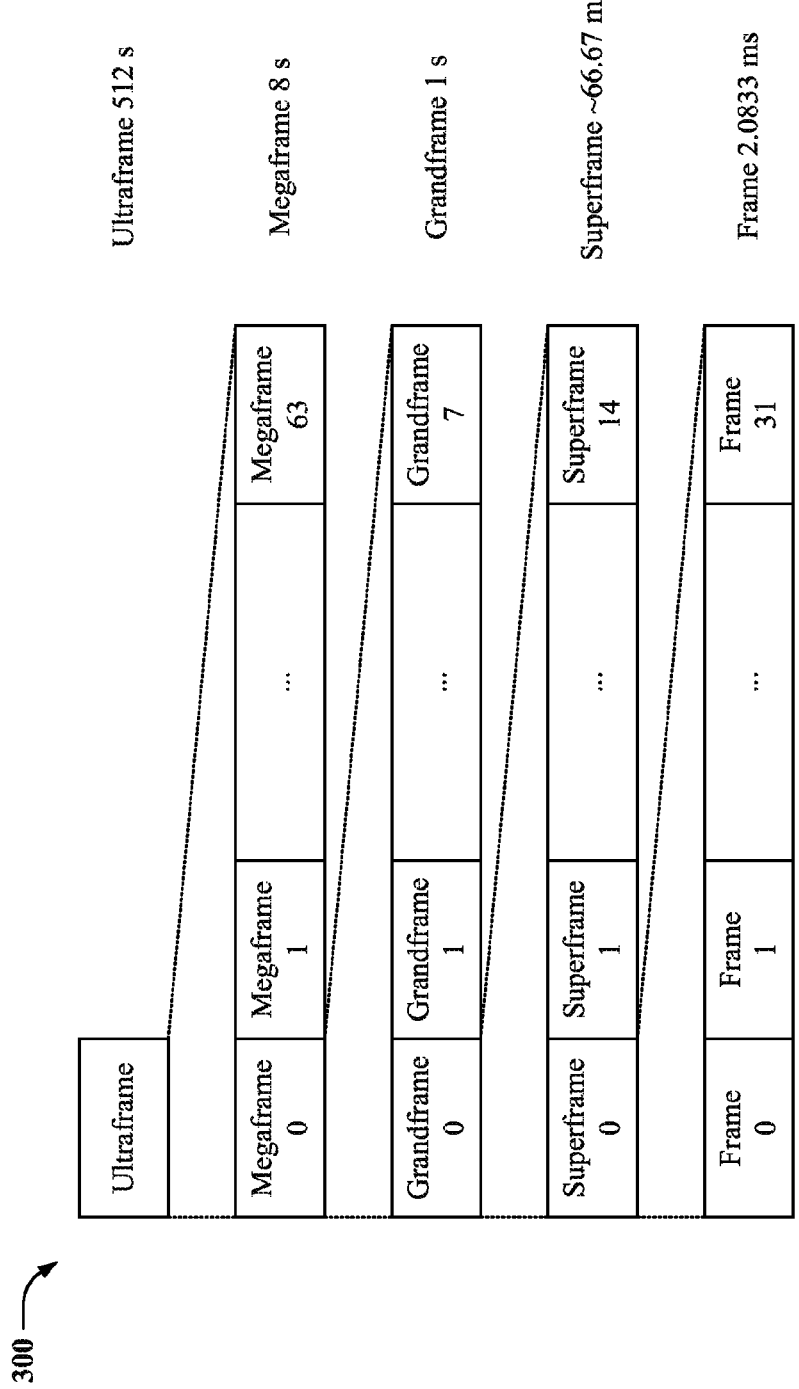
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
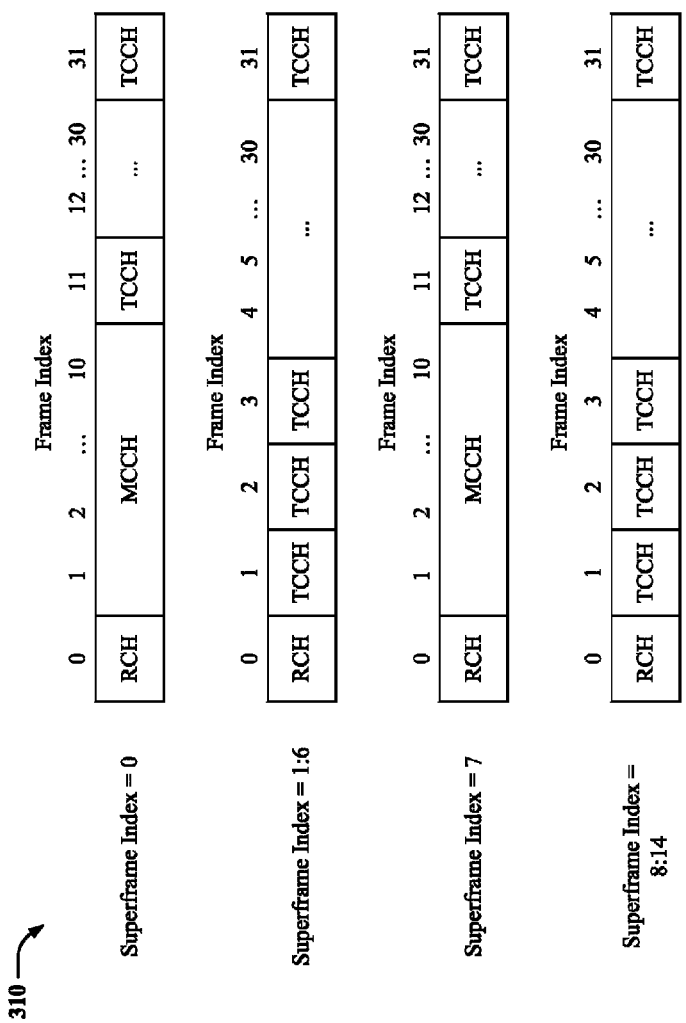
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
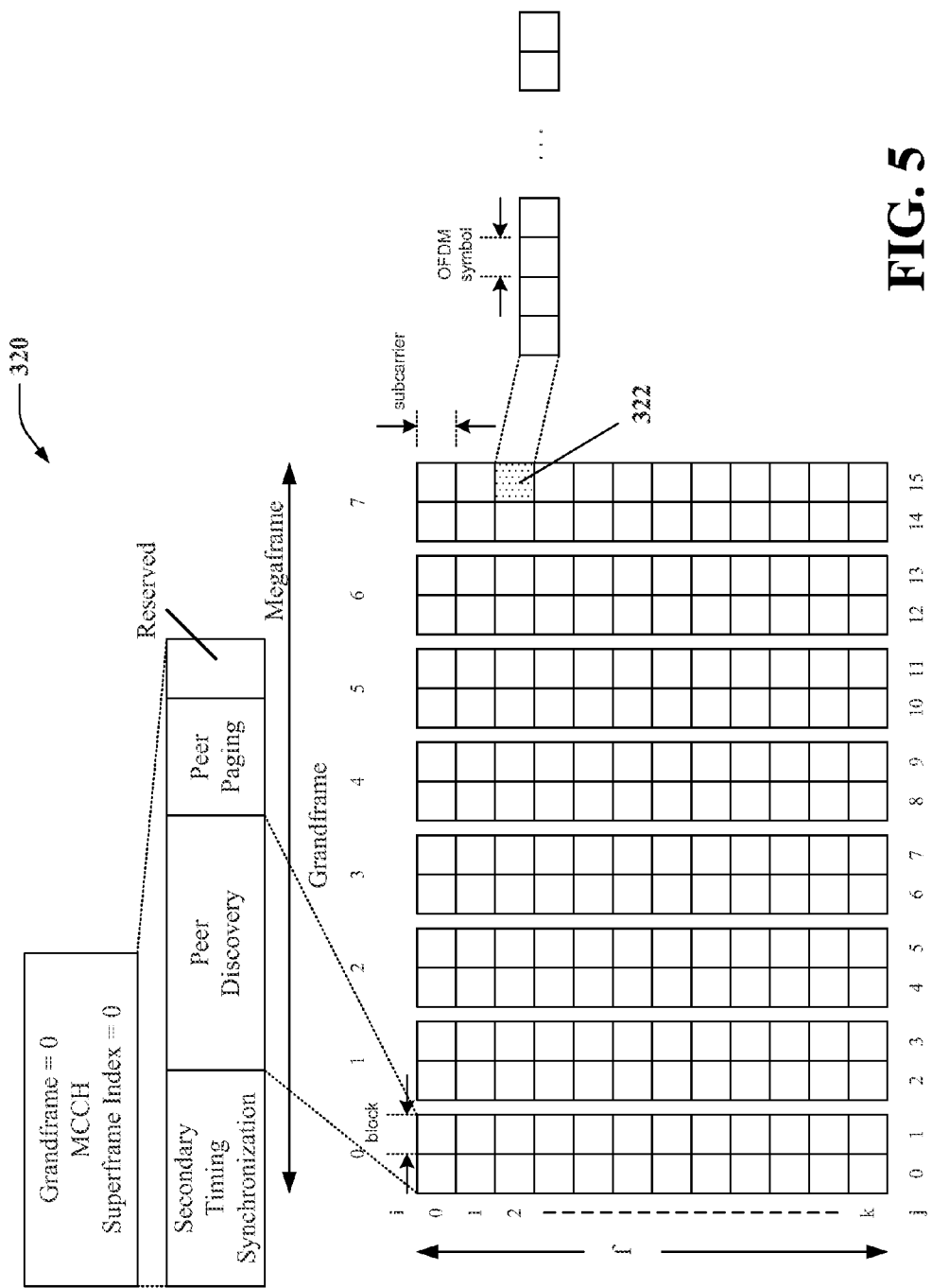
FIG. 5 is a diagram illustrating an operation timeline of a miscellaneous channel and a structure of a peer discovery channel.

FIG. 5 is a diagram 320 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency divisional multiplexing (OFDM) symbols at the same subcarrier (e.g., 72 resource elements). FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices. The peer discovery signals may include unique expressions that allow users to determine to which wireless devices to form a peer-to-peer communication link.

Figure 6:
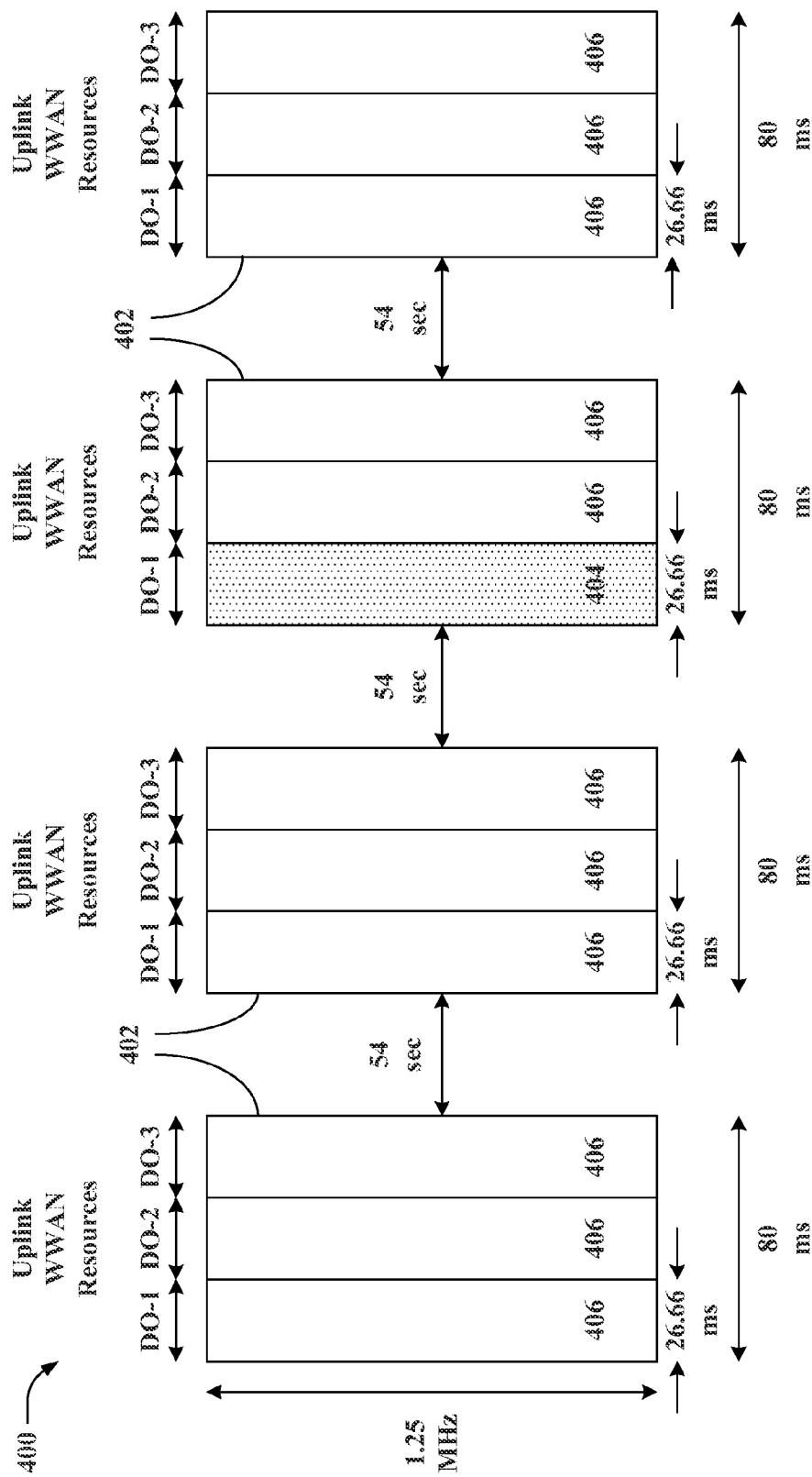
FIG. 6 is a diagram illustrating exemplary WWAN resources.

FIG. 6 is a diagram 400 illustrating exemplary WWAN resources. FIG. 6 illustrates uplink WWAN resources for an evolution data optimized/only (EV-DO) system, and particularly an EV-DO silence interval within a CDMA2000 system, but the exemplary methods are applicable to other systems as well, such as systems with pre-defined silent periods on either uplink or downlink and time division multiple access (TDMA) based systems such as Global System for Mobile Communications (GSM), Long Term Evolution (LTE) Time Division Duplex (TDD), Personal Handy-phone System (PHS), Personal Digital Cellular (PDC), Digital Enhanced Cordless Telecommunications (DECT), and IS-54/IS-136 (known as Digital AMPS (D-AMPS)). For example, the exemplary methods may be utilized in particular time slots in GMS or LTE TDD systems. EV-DO (previously known as 1×EV-DO) is a telecommunications standard for the wireless transmission of data through radio signals. EV-DO is part of the CDMA2000 family of standards. EV-DO uses multiplexing techniques such as CDMA and TDMA to maximize both individual users' throughput and the overall system throughput. An EV-DO channel has a bandwidth of 1.25 MHz. In an EV-DO system, every 54 seconds there is an 80 ms silence interval in which the EV-DO devices are required to stop transmitting in the uplink to allow the base station to measure the power of the background interference and noise. The periodic (or repetitive) 80 ms silence interval 402 includes three consecutive frames, each of which is approximately 26.66 ms (i.e., 80/3 ms). In an exemplary method, the base station allocates the silence interval 402 for peer discovery, and therefore allows wireless devices to utilize the silence interval 402 for peer discovery. In order to avoid causing interference to WWAN communication within a WWAN, wireless devices may utilize the silence interval 402 for peer discovery rather than a set of resources allocated every second in each grandframe as discussed in FIG. 5.

In one configuration, the base station utilizes at least one frame of a silence interval of a plurality of silence intervals to measure background interference and noise. For example, the base station may utilize one frame 404 of one silence interval of every four silence intervals. As such, the EV-DO silence interval 402 may include a first subset of resources 404 and a second subset of resources 406. The first subset of resources 404 are utilized by the serving base station to measure noise and the second subset of resources 406 are unutilized by the base station to measure noise and are allocated to wireless devices for peer discovery.

Figure 7:
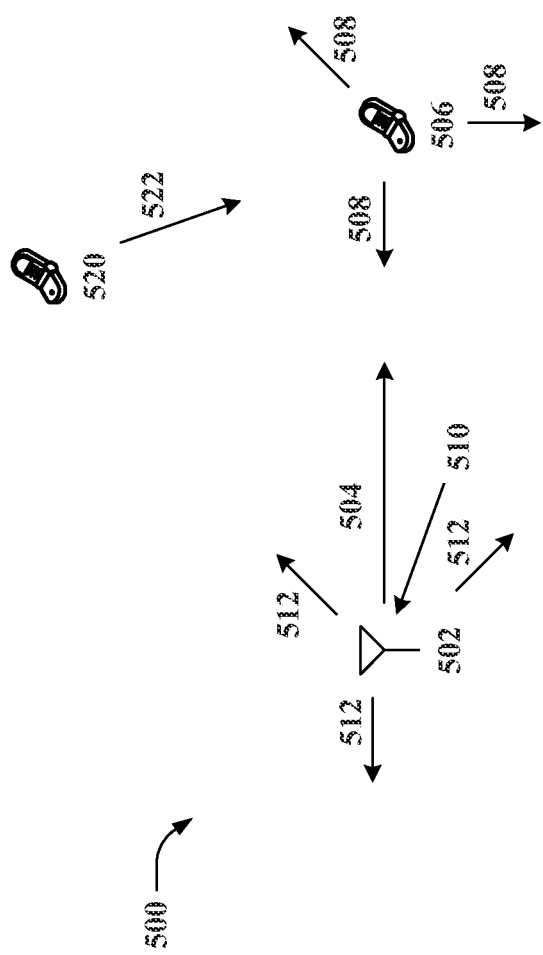
FIG. 7 is a diagram for illustrating an exemplary method.

FIG. 7 is a diagram 500 for illustrating an exemplary method. The base station 502 may be part of a GSM network, a network that utilizes CDMA as an underlying multiple access method (e.g., cdmaOne or CDMA2000), a TDMA based network, or otherwise a network that has pre-defined silent periods on either the uplink or the downlink. The base station 502 broadcasts a signal 504 indicating WWAN resources that can be utilized for peer discovery. As discussed supra, the WWAN resources may be an EV-DO silence interval in uplink resources. Within an EV-DO system, the signal 504 may be a SectorParameters message sent within a downlink broadcast channel and may define the duration and period of the EV-DO silence interval. The signal 504 may additionally indicate which EV-DO silence intervals and which frames of the EV-DO silence intervals that can or cannot be used for peer discovery. For example, the signal 504 may indicate that resources 404 cannot be used for peer discovery and/or that resources 406 can be used for peer discovery. The wireless device 506 receives the broadcast signal 504 and uses the allocated EV-DO silence intervals for peer discovery to broadcast OFDM peer discovery signals 508 and/or to receive OFDM peer discovery signals, such as the OFDM peer discovery signal 522 sent from the wireless device 520. The base station 502 measures noise 510 received in the resources 404 and refrains from measuring noise 510 received in the resources 406.

In one configuration, the base station 502 listens or monitors for OFDM peer discovery signals, such as the OFDM peer discovery signal 508, and based on the received OFDM peer discovery signal 508, transmits an OFDM peer discovery signal 512 in the resources 406 allocated to wireless devices for peer discovery. The base station 502 may transmit a different OFDM peer discovery signal than the OFDM peer discovery signal 508. Alternatively, the base station 502 may transmit the same OFDM peer discovery signal 508, and therefore act to relay received OFDM peer discovery signals. The base station 508 may relay received OFDM peer discovery signals on the same or different time frequency resources utilized by the wireless device 506 to transmit the OFDM peer discovery signals 508.

Figure 8:
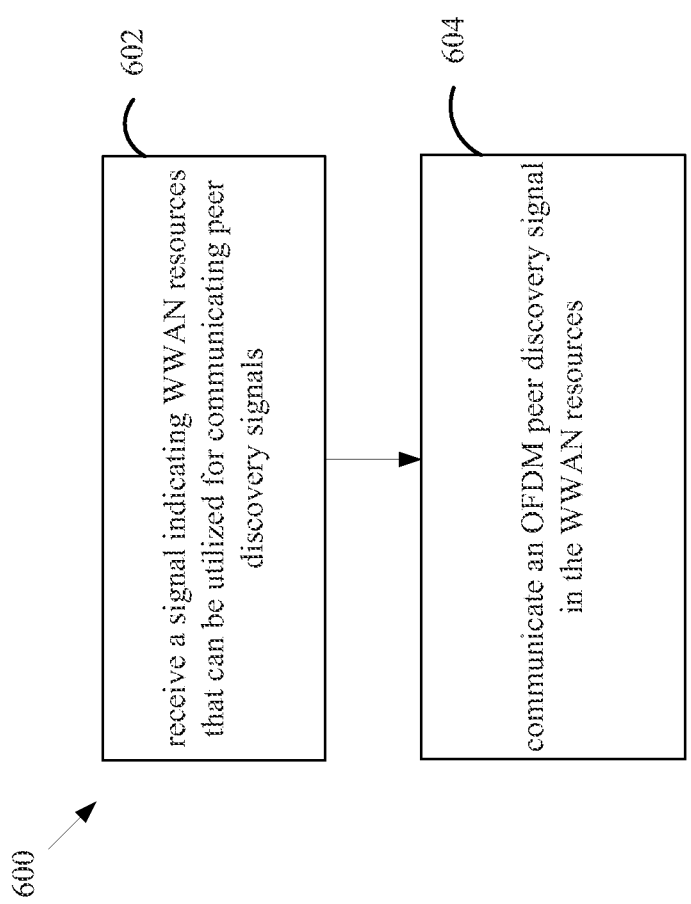
FIG. 8 is a flow chart of a first method of wireless communication.

FIG. 8 is a flow chart 600 of a first method of wireless communication. The method is performed by a wireless device, such as the wireless device 506. According to the method, the wireless device 506 receives a signal indicating WWAN resources that can be utilized for communicating peer discovery signals (602). In addition, the wireless device 506 communicates an OFDM peer discovery signal in the WWAN resources (604). In step 604, the wireless device 506 may communicate the peer discovery signal by receiving the peer discovery signal from another wireless device. For example, the wireless device 506 may receive the peer discovery signal 522 from the wireless device 520. The peer discovery signal 522 received from the wireless device 520 may include a unique expression of the wireless device 520. In response to receiving the expression, the wireless device 506 may compare the received expression with a pre-stored expression, and if the expressions match, may send a connection request signal to the wireless device 520 directly or through the base station 502. Alternatively, in step 604, the wireless device 506 may communicate the peer discovery signal by sending the peer discovery signal. For example, the wireless device 506 may broadcast a unique expression through the peer discovery signal 508. As discussed supra, the WWAN resources may be resources dedicated for a silence interval. The silence interval may be an EV-DO silence interval. The WWAN resources may include a first subset of resources utilized by a base station to measure noise and a second subset of resources unutilized by the base station to measure noise. In such a configuration, the wireless device 506 communicates the OFDM peer discovery signal in the second subset of resources. For example, as shown in FIG. 6, the first subset of resources may include the resources 404 and the second subset of resources may include the resources 406. Different configurations of the first and second subsets of resources are possible.

Figure 9:
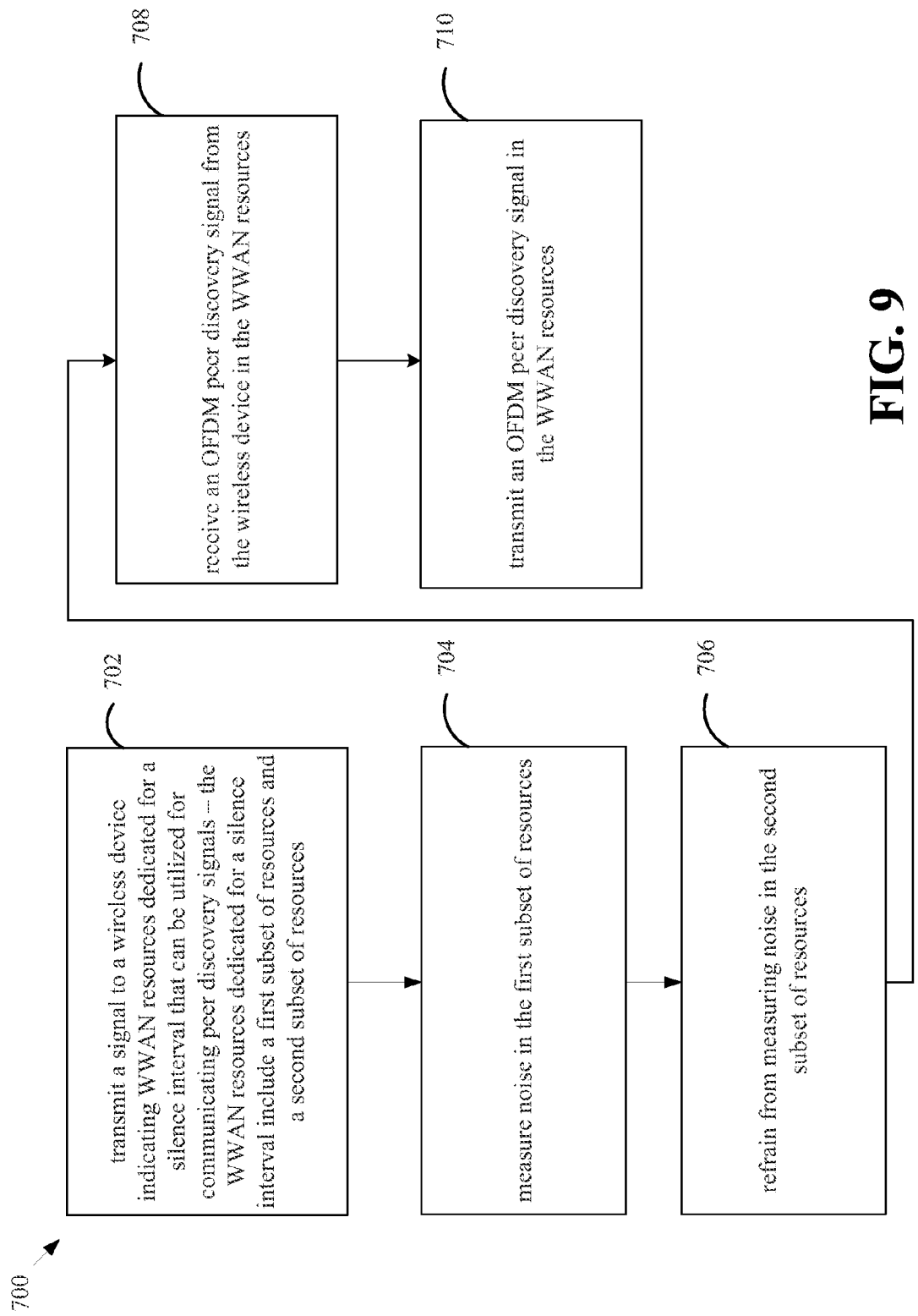
FIG. 9 is a flow chart of a second method of wireless communication.

FIG. 9 is a flow chart 700 of a second method of wireless communication. The method is performed by a base station, such as the base station 502. According to the method, the base station 502 transmits a signal to a wireless device indicating WWAN resources dedicated for a silence interval that can be utilized for communicating peer discovery signals. The WWAN resources dedicated for a silence interval include a first subset of resources, such as resources 404, and a second subset of resources, such as resources 406 (702). In addition, the base station 502 measures noise in the first subset of resources 404 (704). Furthermore, the base station 502 refrains from measuring noise in the second subset of resources 406 (706). The silence interval may be an EV-DO silence interval. The base station 502 may receive an OFDM peer discovery signal from the wireless device in the WWAN resources (708). The OFDM peer discovery signal may be received in the second subset of resources 406. In addition, the base station 502 may transmit an OFDM peer discovery signal in the WWAN resources (710). The transmitted OFDM peer discovery signal may be based on the received OFDM peer discovery signal. For example, an OFDM peer discovery signal received from the wireless device 506 may include a unique expression of the wireless device 506. The base station 502 may transmit a second expression based on the unique expression. Alternatively, the base station 502 may act as a relay and transmit the same expression broadcasted by the wireless device 506.

Figure 10:
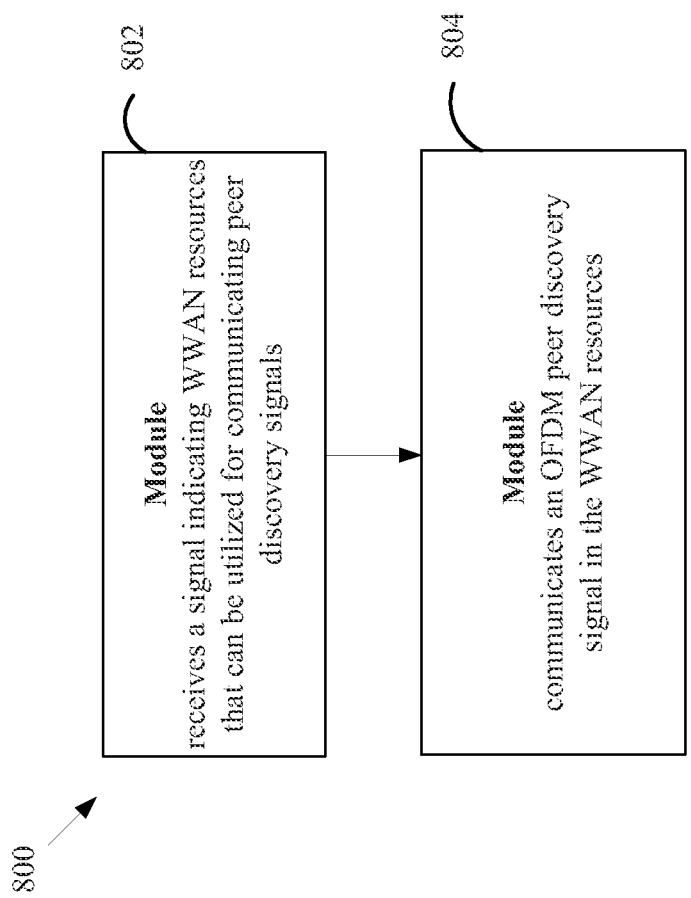
FIG. 10 is a conceptual block diagram illustrating the functionality of an exemplary apparatus.

FIG. 10 is a conceptual block diagram 800 illustrating the functionality of an exemplary apparatus 100. The apparatus 100 is a wireless device and includes a module 802 that receives a signal indicating WWAN resources that can be utilized for communicating peer discovery signals. In addition, the apparatus 100 includes a module 804 that communicates an OFDM peer discovery signal in the WWAN resources. The apparatus 100 may include additional modules that perform each of the steps in the aforementioned flow charts. As such, each step in the aforementioned flow charts may be performed by a module and the apparatus 100 may include one or more of those modules.

Figure 11:
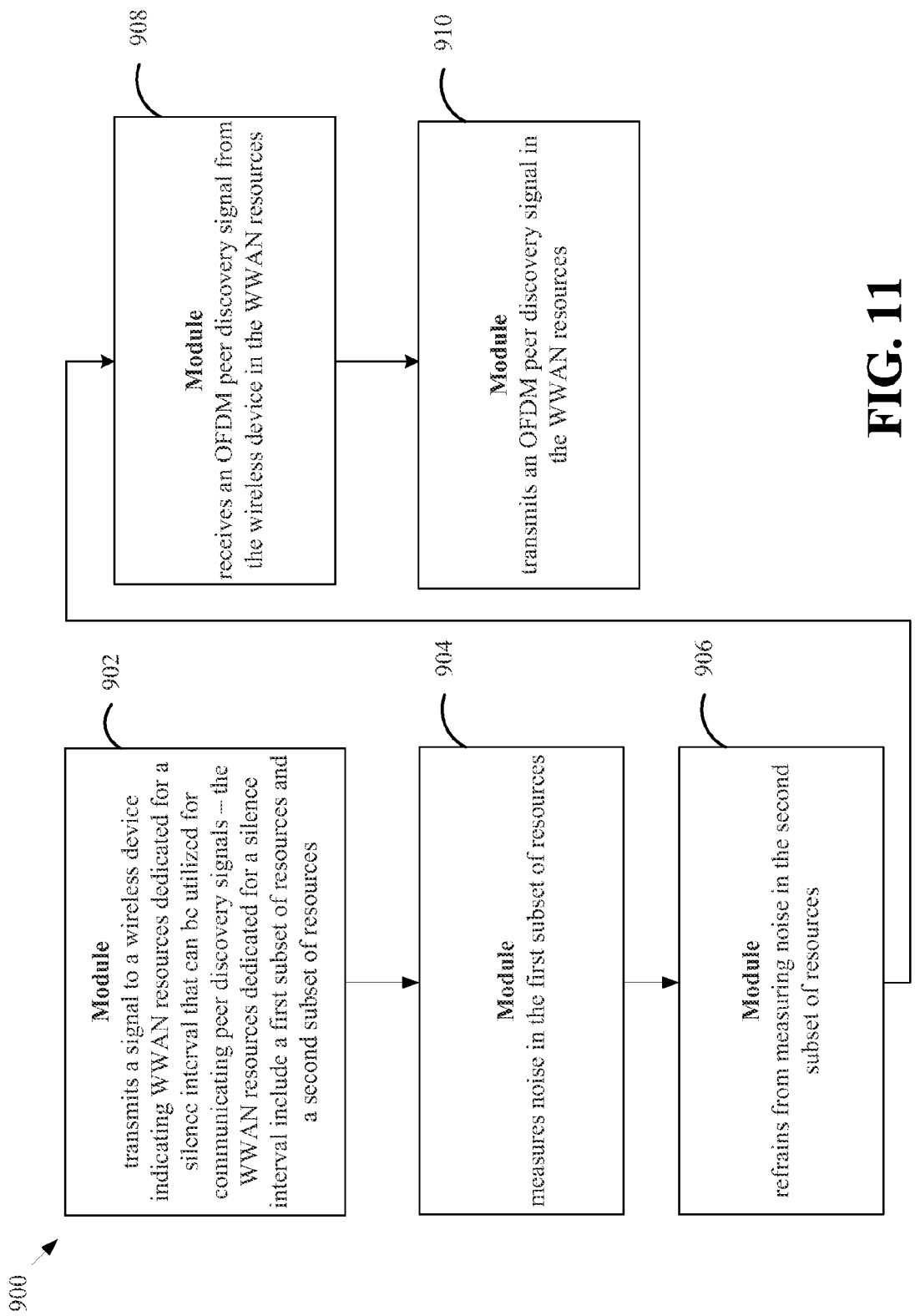
FIG. 11 is a conceptual block diagram illustrating the functionality of another exemplary apparatus.

FIG. 11 is a conceptual block diagram 900 illustrating the functionality of another exemplary apparatus. The apparatus 100 is a base station and include a module 902 that transmit a signal to a wireless device indicating WWAN resources dedicated for a silence interval that can be utilized for communicating peer discovery signals. The WWAN resources dedicated for a silence interval include a first subset of resources and a second subset of resources. In addition, the apparatus 100 includes a module 904 that measures noise in the first subset of resources. Furthermore, the apparatus 100 includes a module 906 that refrains from measuring noise in the second subset of resources. The apparatus 100 may further include a module 908 that receives an OFDM peer discovery signal from the wireless device in the WWAN resources. The OFDM peer discovery signal may be received in the second subset of resources. The apparatus 100 may further include a module 910 that transmits an OFDM peer discovery signal in the WWAN resources. The transmitted OFDM peer discovery signal may be based on the received OFDM peer discovery signal. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in one configuration, the apparatus 100 for wireless communication is a wireless device and includes means for receiving a signal indicating WWAN resources that can be utilized for communicating peer discovery signals. The apparatus 100 further includes means for communicating an OFDM peer discovery signal in the WWAN resources. The aforementioned means is the processing system 114 configured to perform the functions recited by the aforementioned means.

In one configuration, the apparatus 100 for wireless communication is a base station and includes means for transmitting a signal to a wireless device indicating WWAN resources dedicated for a silence interval that can be utilized for communicating peer discovery signals. The WWAN resources dedicated for a silence interval include a first subset of resources and a second subset of resources. The apparatus 100 further includes means for measuring noise in the first subset of resources and means for refraining from measuring noise in the second subset of resources. The apparatus 100 may further include means for receiving an OFDM peer discovery signal from the wireless device in the WWAN resources. The apparatus 100 may further include means for transmitting an OFDM peer discovery signal in the WWAN resources. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a signal indicating wireless wide area network (WWAN) resources that can be utilized for communicating peer discovery signals; and
   communicating an orthogonal frequency-division multiplexing (OFDM) peer discovery signal in the WWAN resources, wherein the WWAN resources are resources dedicated for a silence interval in which no uplink transmission occurs.

2. The method of claim 1, wherein the communicating comprises receiving the peer discovery signal from another wireless device.

3. The method of claim 1, wherein the communicating comprises sending the peer discovery signal.

4. The method of claim 1, wherein no uplink transmission occurs during the silence period to allow background interference and noise to be measured.

5. The method of claim 1, wherein the silence interval is an Evolution-Data Optimized/only (EV-DO) silence interval.

6. The method of claim 1, wherein the WWAN resources comprise a first subset of resources in a first time interval utilized by a base station to measure noise and a second subset of resources in a second time interval unutilized by the base station to measure noise, and the OFDM peer discovery signal is communicated in the second subset of resources.

7. A method of wireless communication, comprising:
   wirelessly transmitting, from a base station, a signal to a wireless device indicating wireless wide area network (WWAN) resources dedicated for a silence interval that is a period where uplink transmission by the wireless device does not occur and can be utilized for communicating peer discovery signals, the WWAN resources dedicated for a silence interval comprising a first subset of resources and a second subset of resources;
   measuring noise in the first subset of resources; and
   refraining from measuring noise in the second subset of resources.

8. The method of claim 7, wherein the silence interval is an Evolution-Data Optimized/only (EV-DO) silence interval.

9. The method of claim 7, further comprising receiving an orthogonal frequency-division multiplexing (OFDM) peer discovery signal from the wireless device in the WWAN resources.

10. The method of claim 9, wherein the OFDM peer discovery signal is received in the second subset of resources.

11. The method of claim 9, further comprising transmitting an OFDM peer discovery signal in the WWAN resources.

12. The method of claim 11, wherein the transmitted OFDM peer discovery signal is based on the received OFDM peer discovery signal.

13. An apparatus for wireless communication, comprising:
   means for receiving a signal indicating wireless wide area network (WWAN) resources that can be utilized for communicating peer discovery signals; and
   means for communicating an orthogonal frequency-division multiplexing (OFDM) peer discovery signal in the WWAN resources, wherein the WWAN resources are resources dedicated for a silence interval in which no uplink transmission occurs.

14. The apparatus of claim 13, wherein the means for communicating receives the peer discovery signal from another wireless device.

15. The apparatus of claim 13, wherein the means for communicating sends the peer discovery signal.

16. The apparatus of claim 13, wherein no uplink transmission occurs during the silence period to allow background interference and noise to be measured.

17. The apparatus of claim 3, wherein the silence interval is an Evolution-Data Optimized/only (EV-DO) silence interval.

18. The apparatus of claim 13, wherein the WWAN resources comprise a first subset of resources in a first time interval utilized by a base station to measure noise and a second subset of resources in a second time interval unutilized by the base station to measure noise, and the OFDM peer discovery signal is communicated in the second subset of resources.

19. An apparatus of a base station for wireless communication, comprising:
   means for wirelessly transmitting, from the base station, a signal to a wireless device indicating wireless wide area network (WWAN) resources dedicated for a silence interval that is a period where uplink transmission by the wireless device does not occur and can be utilized for communicating peer discovery signals, the WWAN resources dedicated for a silence interval comprising a first subset of resources and a second subset of resources;
   means for measuring noise in the first subset of resources; and
   means for refraining from measuring noise in the second subset of resources.

20. The apparatus of claim 19, wherein the silence interval is an Evolution-Data Optimized/only (EV-DO) silence interval.

21. The apparatus of claim 19, further comprising means for receiving an orthogonal frequency-division multiplexing (OFDM) peer discovery signal from the wireless device in the WWAN resources.

22. The apparatus of claim 21, wherein the OFDM peer discovery signal is received in the second subset of resources.

23. The apparatus of claim 21, further comprising means for transmitting an OFDM peer discovery signal in the WWAN resources.

24. The apparatus of claim 23, wherein the transmitted OFDM peer discovery signal is based on the received OFDM peer discovery signal.

25. A computer program product, comprising:
a non-transitory computer-readable medium comprising code for:
receiving a signal indicating wireless wide area network (WWAN) resources that can be utilized for communicating peer discovery signals; and
communicating an orthogonal frequency-division multiplexing (OFDM) peer discovery signal in the WWAN resources, wherein the WWAN resources are resources dedicated for a silence interval in which no uplink transmission occurs.

26. The computer program product of claim 25, wherein the code for communicating receives the peer discovery signal from another wireless device.

27. The computer program product of claim 25, wherein the code for communicating sends the peer discovery signal.

28. The computer program product of claim 25, wherein no uplink transmission occurs during the silence period to allow background interference and noise to be measured.

29. The computer program product of claim 25, wherein the silence interval is an Evolution-Data Optimized/only (EV-DO) silence interval.

30. The computer program product of claim 25, wherein the WWAN resources comprise a first subset of resources in a first time interval utilized by a base station to measure noise and a second subset of resources in a second time interval unutilized by the base station to measure noise, and the OFDM peer discovery signal is communicated in the second subset of resources.

31. A computer program product, comprising:
a non-transitory computer-readable medium comprising code for:
wirelessly transmitting, from a base station, a signal to a wireless device indicating wireless wide area network (WWAN) resources dedicated for a silence interval that is a period where uplink transmission by the wireless device does not occur and can be utilized for communicating peer discovery signals, the WWAN resources dedicated for a silence interval comprising a first subset of resources and a second subset of resources;
measuring noise in the first subset of resources; and
refraining from measuring noise in the second subset of resources.

32. The computer program product of claim 31, wherein the silence interval is an Evolution-Data Optimized/only (EV-DO) silence interval.

33. The computer program product of claim 31, wherein the computer-readable medium further comprises code for receiving an orthogonal frequency-division multiplexing (OFDM) peer discovery signal from the wireless device in the WWAN resources.

34. The computer program product of claim 33, wherein the OFDM peer discovery signal is received in the second subset of resources.

35. The computer program product of claim 33, wherein the computer-readable medium further comprises code for transmitting an OFDM peer discovery signal in the WWAN resources.

36. The computer program product of claim 35, wherein the transmitted OFDM peer discovery signal is based on the received OFDM peer discovery signal.

37. An apparatus for wireless communication, comprising:
a processing system configured to:
receive a signal indicating wireless wide area network (WWAN) resources that can be utilized for communicating peer discovery signals; and
communicate an orthogonal frequency-division multiplexing (OFDM) peer discovery signal in the WWAN resources, wherein the WWAN resources are resources dedicated for a silence interval in which no uplink transmission occurs; and
a memory coupled to the processing system.

38. The apparatus of claim 37, wherein to communicate, the processing system is configured to receive the peer discovery signal from another wireless device.

39. The apparatus of claim 37, wherein to communicate, the processing system is configured to send the peer discovery signal.

40. The apparatus of claim 37, wherein no uplink transmission occurs during the silence period to allow background interference and noise to be measured.

41. The apparatus of claim 37, wherein the silence interval is an Evolution-Data Optimized/only (EV-DO) silence interval.

42. The apparatus of claim 37, wherein the WWAN resources comprise a first subset of resources in a first time interval utilized by a base station to measure noise and a second subset of resources in a second time interval unutilized by the base station to measure noise, and the OFDM peer discovery signal is communicated in the second subset of resources.

43. An apparatus of a base station for wireless communication, comprising:
a processing system configured to:
wirelessly transmit, from the base station, a signal to a wireless device indicating wireless wide area network (WWAN) resources dedicated for a silence interval that is a period where uplink transmission by the wireless device does not occur and can be utilized for communicating peer discovery signals, the WWAN resources dedicated for a silence interval comprising a first subset of resources and a second subset of resources;
measure noise in the first subset of resources; and
refrain from measuring noise in the second subset of resources; and
a memory coupled to the processing system.

44. The apparatus of claim 43, wherein the silence interval is an Evolution-Data Optimized/only (EV-DO) silence interval.

45. The apparatus of claim 43, wherein the processing system is further configured to receive an orthogonal frequency-division multiplexing (OFDM) peer discovery signal from the wireless device in the WWAN resources.

46. The apparatus of claim 45, wherein the OFDM peer discovery signal is received in the second subset of resources.

47. The apparatus of claim 45, wherein the processing system is further configured to transmit an OFDM peer discovery signal in the WWAN resources.

48. The apparatus of claim 47, wherein the transmitted OFDM peer discovery signal is based on the received OFDM peer discovery signal.

\* \* \* \* \*